United States Patent
Hoshino et al.

(10) Patent No.: US 8,736,736 B2
(45) Date of Patent: May 27, 2014

(54) IMAGING APPARATUS EQUIPPED WITH IMAGE ENLARGING DISPLAY FUNCTION, RECORDING MEDIUM RECORDING CONTROL PROGRAM OF THE IMAGING APPARATUS, AND CONTROL METHOD OF THE IMAGING APPARATUS

(75) Inventors: Hiroyuki Hoshino, Ome (JP); Erina Ichikawa, Sagamihara (JP); Hiroshi Shimizu, Akishima (JP); Jun Muraki, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 521 days.

(21) Appl. No.: 12/975,858

(22) Filed: Dec. 22, 2010

(65) Prior Publication Data

US 2011/0157385 A1    Jun. 30, 2011

(30) Foreign Application Priority Data

Dec. 25, 2009  (JP) ................................ 2009-293577

(51) Int. Cl.
*H04N 5/222*  (2006.01)

(52) U.S. Cl.
USPC .............. 348/333.12; 348/208.99; 348/240.2; 348/333.03; 348/333.11; 396/52

(58) Field of Classification Search
USPC .............. 348/333.12, 208.99, 208.2, 333.11, 348/240.2, 333.03; 396/52, 53
See application file for complete search history.

(56) References Cited

U.S. PATENT DOCUMENTS

| | | | |
|---|---|---|---|
| 7,710,458 B2 | 5/2010 | Yuyama et al. | |
| 7,864,240 B2 | 1/2011 | Ide et al. | |
| 7,936,396 B2 | 5/2011 | Okazaki | |
| 2002/0097325 A1 | 7/2002 | Tanizoe et al. | |
| 2005/0122402 A1* | 6/2005 | Kumaki | 348/208.1 |
| 2009/0231448 A1 | 9/2009 | Yuyama et al. | |
| 2010/0231748 A1 | 9/2010 | Takeda | |

FOREIGN PATENT DOCUMENTS

| | | |
|---|---|---|
| CN | 101132485 A | 2/2008 |
| CN | 101444084 A | 5/2009 |
| JP | 11-55560 A | 2/1999 |
| JP | 11-341331 A | 12/1999 |

(Continued)

OTHER PUBLICATIONS

Japanese Office Action dated Nov. 29, 2011 (and English translation thereof) in counterpart Japanese Application No. 2009-293577.

(Continued)

*Primary Examiner* — Paul Berardesca
(74) *Attorney, Agent, or Firm* — Holtz, Holtz, Goodman and Chick, PC

(57) ABSTRACT

An imaging apparatus includes a display section to sequentially display each of the images generated by the imaging section and an enlargement display control section to sequentially display parts of the images generated by the imaging section on the display section while enlarging the parts by a predetermined enlargement factor. The imaging section changes the enlargement factor of the enlargement display control section according to a shake quantity detected by the detecting section or an optical zoom magnification of an optical zoom section.

15 Claims, 9 Drawing Sheets

(56) References Cited

FOREIGN PATENT DOCUMENTS

| | | | |
|---|---|---|---|
| JP | 2006-267217 A | 10/2006 | |
| JP | 2008-054062 A | 3/2008 | |
| JP | 2008-079124 A | 4/2008 | |
| JP | 2009-177345 * | 8/2009 | ............. H04N 5/225 |
| JP | 2009-177345 A | 8/2009 | |
| JP | 2010-016613 A | 1/2010 | |
| TW | 200833087 A | 8/2008 | |
| WO | WO 2006/135107 A2 | 12/2006 | |

OTHER PUBLICATIONS

Korean Office Action dated Jun. 27, 2012 and English translation thereof in counterpart Korean Application No. 10-2010-0134676.
Chinese Office Action dated Sep. 26, 2012 (and English translation thereof) in counterpart Chinese Application No. 201010625085.4.
Korean Office Action dated Dec. 28, 2012 (and English translation thereof) in counterpart Korean Application No. 10-2010-0134676.
Taiwanese Office Action dated Jun. 19, 2013 (and English translation thereof) in counterpart Taiwanese Application No. 099145687.

* cited by examiner

FIG. 3

| SHAKE QUANTITY / OPTICAL ZOOM MAGNIFICATION | 1 | 2 | 3 | ... |
|---|---|---|---|---|
| 1 | 1 | 2 | 3 | ... |
| 2 | 2 | 4 | 6 | ... |
| 3 | 3 | 6 | 9 | ... |
| ... | ... | ... | ... | ... |

FIG. 6A

| DEFLECTION QUANTITY | EVALUATION VALUE |
|---|---|
| 1 | 1 |
| 2 | 2 |
| 3 | 3 |
| 4 | 4 |
| 5 | 5 |
| ... | ... |

FIG. 6B

| EVALUATION VALUE | ADJUSTMENT OF SET ENLARGEMENT FACTOR |
|---|---|
| 1 ~ 4 | INCREASE |
| 5 ~ 15 | KEEP |
| 16以上 | DECREASE |

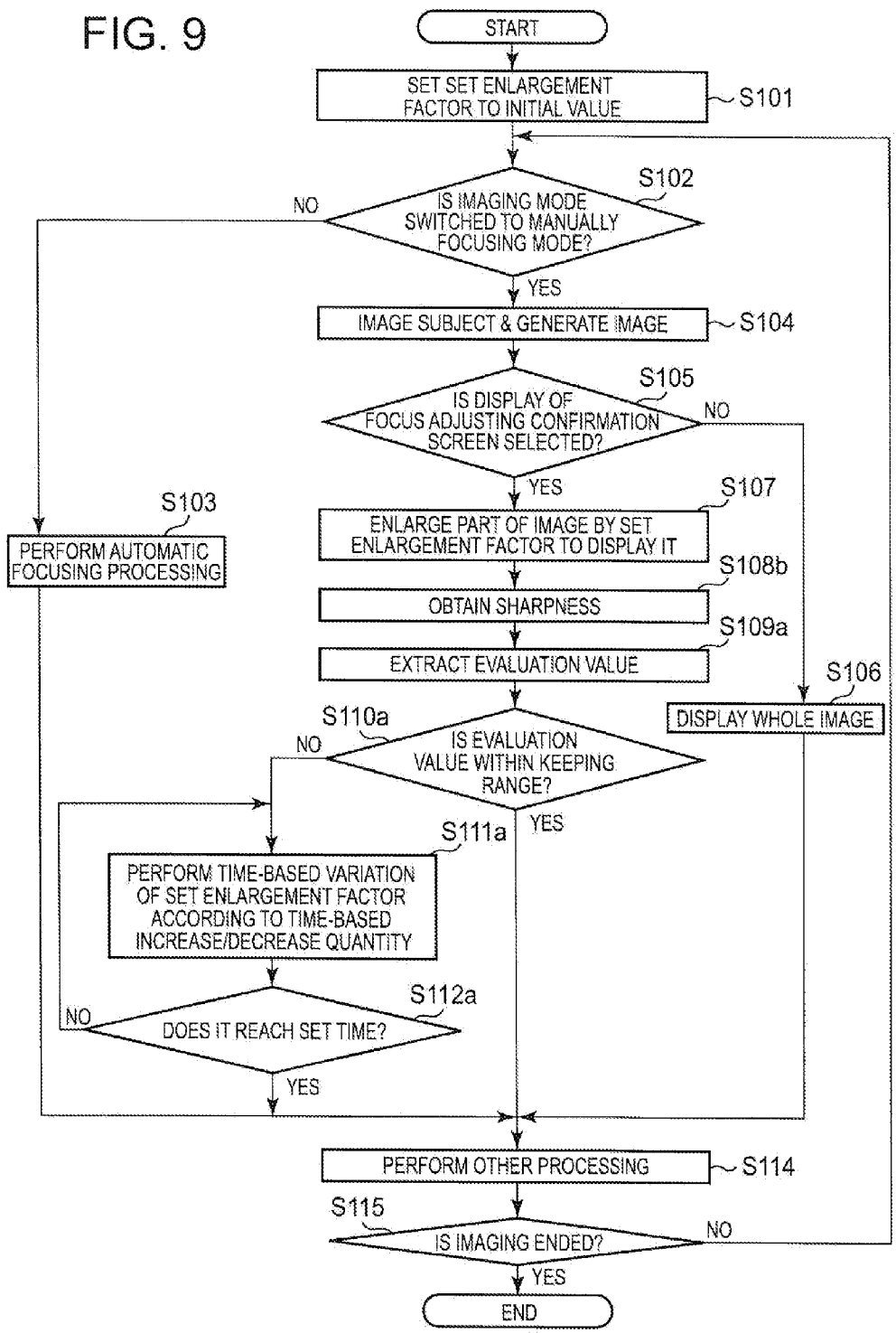

IMAGING APPARATUS EQUIPPED WITH IMAGE ENLARGING DISPLAY FUNCTION, RECORDING MEDIUM RECORDING CONTROL PROGRAM OF THE IMAGING APPARATUS, AND CONTROL METHOD OF THE IMAGING APPARATUS

BACKGROUND OF THE INVENTION

1. Field of the Invention

The present invention relates to an imaging apparatus equipped with an enlargement display function of performing an enlargement display of a part of an imaging image, a recording medium recording a control program of the imaging apparatus, and a control method of the imaging apparatus.

2. Description of the Related Art

An imaging apparatus, such as a digital camera, which is equipped with a liquid crystal display monitor, composed of a liquid crystal display (LCD), and uses the display screen of the liquid crystal display monitor as a viewfinder by the use of an image displayed as a live view has conventionally been known. Because the resolution of the liquid crystal display monitor is lower than that of the imaging device of the imaging apparatus, the imaging apparatus has the problem in which it cannot be easily judged with the screen of the liquid crystal display monitor whether the focus of an image is correctly adjusted or not when a user performs a focus adjustment by a manual operation.

An imaging apparatus is accordingly known that makes it possible to easily sight whether a focus is adjusted or not by displaying an image imaged by an imaging device by enlarging the image by a predetermined enlargement factor on the display screen of a liquid crystal display monitor at the time of a manual operation in an imaging apparatus capable of performing the manual operation of focus adjustment (see, for example, Japanese Patent Application Laid-Open Publications Nos. H 11-341331 and H 11-055560).

The imaging apparatus described in Japanese Patent Application Laid-Open Publications Nos. H 11-341331 and H 11-055560, however, have the problem in which it is apprehended that the focus adjustment when the setting of an enlargement factor is not proper at the time of displaying an image on a liquid crystal display monitor by enlarging the image is made to be more difficult by the enlarged image. For example, if an enlargement factor is set to be high despite a state in which a camera shake has happened or a state in which the optical zoom magnification of an optical zoom is high, then a subject in a display screen easily performs a large position change, and consequently the subject is missed to makes the focus adjustment difficult.

SUMMARY OF THE INVENTION

An aspect of the present invention is an imaging apparatus equipped with an imaging section to generate images by imaging a subject, comprising:

a display section to sequentially display each of the images generated by the imaging section;

an enlargement display control section to sequentially display parts of the images generated by the imaging section on the display section while enlarging the parts by a predetermined enlargement factor;

a detecting section to detect a shake quantity of the imaging apparatus; and an enlargement factor control section to change the enlargement factor at a time of enlargement by the enlargement display control section according to the shake quantity detected by the detecting section.

Moreover, another aspect of the present invention is an imaging apparatus equipped with an imaging section to generate images by imaging a subject, comprising:

an optical zoom section to set an optical zoom magnification to an arbitrary magnification;

a display section to sequentially display each of the images generated by the imaging section according to the optical zoom magnification set by the optical zoom section;

an enlargement display control section to sequentially display parts of the images generated by the imaging section according to the optical zoom magnification set by the optical zoom section on the display section while further enlarging the parts by a predetermined enlargement factor; and an enlargement factor control section to change the enlargement factor at a time of enlargement by the enlargement display control section according to the optical zoom magnification set by the optical zoom section.

Moreover, another aspect of the present invention is an recording medium recording a control program of an imaging apparatus including an imaging section to generate images by imaging a subject, a display section to sequentially display each of the images generated by the imaging section, and a detecting section to detect a shake quantity of the imaging apparatus, the recording medium recording a program enabling a computer of the imaging apparatus to function as an enlargement display control section to display parts of the images sequentially generated by the imaging section on the display section while enlarging the parts by a predetermined enlargement factor; and an enlargement factor control section to change the enlargement factor at a time of enlargement by the enlargement display control section according to the shake quantity detected by the detecting section.

Furthermore, another aspect of the present invention is a recording medium recording a control program of an imaging apparatus including an imaging section to generate images by imaging a subject, an optical zoom section to set an optical zoom magnification to an arbitrary magnification, and a display section to sequentially display each of the images generated by the imaging section according to the optical zoom magnification set by the optical zoom section, the recording medium recording a program enabling a computer of the imaging apparatus to function as an enlargement display control section to sequentially display parts of the images generated by the imaging section on the display section according to the optical zoom magnification set by the optical zoom section while further enlarging the parts by a predetermined enlargement factor; and an enlargement factor control section to change the enlargement factor at a time of enlargement by the enlargement display control section according to the optical zoom magnification set by the optical zoom section.

Furthermore, another aspect of the present invention is a control method of an imaging apparatus including an imaging section to generate images by imaging a subject, a display section to sequentially display each of the images generated by the imaging section, and a detecting section to detect a shake quantity of the imaging apparatus, the control method comprising the steps of:

sequentially displaying parts of the images generated by the imaging section on the display section while enlarging the parts by a predetermined enlargement factor; and changing the enlargement factor at a time of enlargement at the step of sequentially displaying the parts according to the shake quantity detected by the detecting section.

Furthermore, according to the other aspect of the present invention is a control method of an imaging apparatus including an imaging section to generate images by imaging a subject, an optical zoom section to set an optical zoom magnification to an arbitrary magnification, and a display section to sequentially display each of the images generated by the imaging section according to the optical zoom magnification set by the optical zoom section, the control method comprising the steps of:

sequentially displaying parts of the images generated by the imaging section on the display section according to the optical zoom magnification set by the optical zoom section while further enlarging the parts by a predetermined enlargement factor; and changing the enlargement factor at a time of enlargement at the step of sequentially displaying the parts according to the optical zoom magnification set by the optical zoom section.

BRIEF DESCRIPTION OF THE DRAWINGS

FIG. 3 is a schematic diagram for describing an evaluation value table of the embodiment 1 of the present invention;

FIG. 6A is a diagram illustrating an evaluation value table for describing the determination processing of variations or keep of a set enlargement factor in the embodiment 2 of the present invention;

FIG. 6B is a diagram illustrating an evaluation value correspondence table for describing the determination processing of variations or keep of a set enlargement factor in the embodiment 2 of the present invention;

FIG. 9 is a flow chart for describing enlargement factor adjusting processing of the imaging apparatus of the embodiment 3 of the present invention.

DETAILED DESCRIPTION OF THE PREFERRED EMBODIMENTS

In the following, concrete aspects of the present invention will be described with reference to the accompanying drawings. The scope of the invention is, however, not limited to the shown examples.

Embodiment 1

Figure 1:
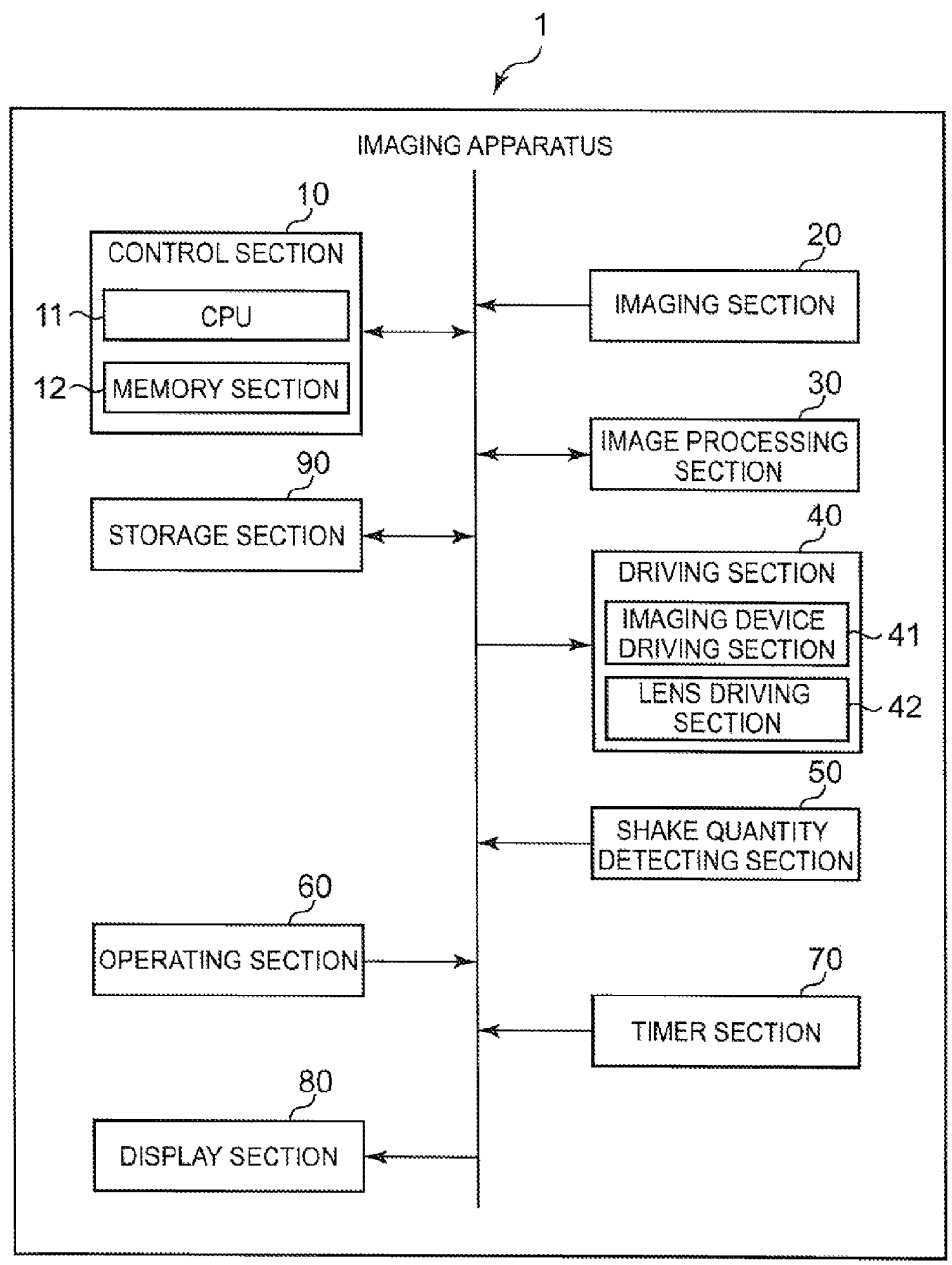
FIG. 1 is a block diagram showing the configuration of the principal part of an imaging apparatus according to an embodiment 1 of the present invention.

An imaging apparatus 1 according to the present embodiment is a digital camera imaging a subject, or the like. Then, as shown in FIG. 1, the imaging apparatus 1 is composed of a control section 10, an imaging section 20, an image processing section 30, a driving section 40, a shake quantity detecting section 50, an operating section 60, a timer section 70, a display section 80, and a storage section 90.

The imaging section 20 generates an image by imaging a subject. To put it concretely, the imaging section 20 is composed of an image lens section, an iris mechanism, an electronic imaging section, an imaging processing section, and the like, although their illustration is omitted.

The image lens section is equipped with a zoom lens, a focus lens, and the like, and forms an image on an electronic imaging section on the basis of the light from a subject.

The iris mechanism narrows down the light output through the image lens section in accordance with an iris value controlled by the control section 10 to adjust the exposure of the lens section.

The electronic imaging section is composed of an imaging device, such as a charge coupled device (CCD) or a complementary metal-oxide semiconductor (CMOS), and the electronic imaging section converts a subject image, formed by the light that has passed through the various lenses and the iris mechanism of the image lens section, into a two-dimensional image signal.

The imaging processing section is equipped with, for example, a timing generator and a vertical driver, although their illustration is omitted. Then, the imaging processing section drives the electronic imaging section to perform scanning with the timing generator and the vertical driver, and makes the electronic imaging section convert a subject image into a two-dimensional image signal every predetermined period. Then, the imaging processing section reads out an image frame for every one screen from the image region of the electronic imaging section to output the read-out image frame to the image processing section 30.

The image processing section 30 performs image quality adjusting processing, resolution converting processing, image compressing processing, and the like, on the basis of an image frame transferred from the imaging section 20 (imaging processing section) to perform the processing of converting an image generated by the imaging section 20 into an image for displaying or an image for recording. To put it concretely, the image processing section 30 suitably adjusts the gain of each color component of red (R), green (G), and blue (B) of the signal of an analog value of the image frame transferred from the image processing section before performing the sample hold of the each color component with a sample hold circuit (the illustration thereof is omitted) to convert the color component subjected to the sample hold into digital data with an analog-to-digital (A/D) converter (the illustration thereof is omitted). Then, the image processing section 30 performs the color process processing, including pixel interpolation processing and γ correction processing, of the digital data with a color process circuit (the illustration thereof is omitted) before generating a luminance signal Y and chrominance difference signals Cb and Cr, each having a digital value. The luminance signal Y and the chrominance difference signals Cb and Cr output from the color process circuit are subjected to direct memory access (DMA) transfer to a memory section 12 of the control section 10 with a DMA controller (the illustration thereof is omitted).

The driving section 40 is composed of a motor and gears (their illustration is omitted) and performs driving according to a control signal output from the control section 10. Then, the driving section 40 is composed of an imaging device driving section 41 to drive the imaging device at the time of imaging a subject with the imaging section 20, a lens driving section 42 to move the zoom lens and the focus lens into an optical axis direction, and the like.

The shake quantity detecting section 50 is composed of a not-illustrated gyro sensor and an operation circuit. Then, the shake quantity detecting section 50 is configured to detect the angular velocity in each of two axial directions with the gyro sensor as a shake quantity detecting sensor, and to perform the operation processing of calculating a shake quantity of the imaging apparatus 1 on the basis of a detected angular velocity with the operation circuit, and further to output the calculated shake quantity to the control section 10.

The operating section 60 is equipped with a switching button for switching an imaging mode for performing imaging by the imaging section 20 to a reproducing mode for reproducing (displaying) the imaged image on the display section 80 and vice versa; a shutter button for executing imaging processing by the imaging section 20; a switching switch for switching between a focus adjustment mode by a user's manual operation (manually focusing mode) and a focus adjustment mode by automatic operation (automatic focusing mode); an adjustment button for performing a focus adjustment in a state of being switched into the manually focusing mode; a display button for displaying a focus adjusting confirmation screen; a setting button for setting an optical zoom magnification (the magnification of an optical zoom by a zoom lens) to an arbitrary magnification; and the like. Then, the operating section 60 is configured to output operation signals according to the contents of operations to the control section 10 when the user operates a button or a switch. Consequently, various kinds of control processing according to the contents of the operations are executed by the control section 10, to which the operation signals have been input.

In addition, the display button may be made to function as a button the depressed period of which the control section 10 judges as a period indicating that a user has determined that a focus adjusting confirmation screen should be displayed only during the period. Furthermore, the display button may be a button capable of performing a toggle operation for making the control section 10 perform the toggle operation, in which, when a user once depresses the display button, the control section 10 executes the operation mode at the time when a display of the focus adjusting confirmation screen is selected, and when the user again depresses the display button, the control section 10 releases the operation mode. Furthermore, the operation section 60 may be configured in such a way that a user can set the functions of the display button in advance with a menu operation.

The timer section 70 is configured to time a time and output a signal pertaining to the timed time to the control section 10.

The display section 80 reads out an image stored in the memory section 12 to display the imaged image imaged by the imaging section 20 on the display screen. To put it concretely, the display section 80 is equipped with a digital video encoder or the like, although the illustration thereof is omitted, and performs the encoding processing of an input image to generate a video signal under the control of the image control section 10. Then, the display section 80 displays the image on the display screen thereof on the basis of the video signal.

Furthermore, when a user performs a switching operation to the manually focusing mode with the operating section 60, the display section 80 displays (live view display) all of the images continuously on the display screen, the images being based on a plurality of image frames imaged by the imaging section 20 according to the optical zoom magnification set with the operating section 60. That is, a user can uses the display screen of the display section 80 as viewfinder in the manually focusing mode.

The storage section 90 is composed of a nonvolatile memory or the like and stores an image output from the image processing section 30 as image data to be stored. Then, the storage section 90 is configured in such a way that, when a switching operation to the reproducing mode is executed in the operating section 60, image data stored in the storage section 90 is read-out by the control section 10, and the read-out image data is displayed on the display screen of the display section 80 as a reproducing image.

The control section 10 is composed of a central processing unit (CPU) 11 and the memory section 12, and performs the integrated control of each section of the imaging apparatus 1. To put it concretely, the control section 10 performs the drive control of the driving section 40 (imaging device driving section 41 and lens driving section 42) according to an imaging operation, a setting operation of the optical zoom magnification, and an adjustment operation of a focus position by a user with the operating section 60; automatic exposure processing (AE processing) of automatically adjusting the exposure conditions (the conditions of, for example, a shutter speed and an iris value) at the time of imaging of an subject by the imaging section 20; automatic focusing processing of automatically adjusting the focus lens to a focus position of a subject when the operating section 60 is switched to the automatic focusing mode, and the like.

That is, the control section 10 functions as an enlargement display control section to sequentially display parts of the images sequentially generated by the imaging section 20 on the display section 80 while enlarging the parts by a predetermined enlargement factor, an enlargement factor control section to change the enlargement factor according to the shake quantity detected by the shake quantity detecting section 50, a focus adjusting section to perform a focus adjustment by a manual operation or a focus adjustment by an automatic focus adjustment, a frame display controlling section to display a frame showing an object region of enlargement or an subject region, which is an object of the automatic focus adjustment by the focus adjusting section, on the display section 80.

The CPU 11 performs various control operations in accordance with various processing programs for the imaging apparatus 1 stored in the memory section 12.

The memory section 12 is composed of a buffer memory for temporarily storing the data to be processed by the CPU 11 and the like, and a program memory for storing the various programs and data pertaining to the execution of the CPU 11. Then, as the programs stored in the memory section 12, an enlargement display control program and an enlargement factor adjustment program are given, and as the data stored in the memory section 12, an evaluation value table, described below, pertaining to the execution of the enlargement factor adjustment program is given.

Next, the various programs stored in the memory section 12 will be described.

The enlargement display control program is a program for enabling the CPU 11 to execute the function of controlling the display of the images sequentially generated by the imaging section 20 on the display section 80 while enlarging the parts of the images by a predetermined enlargement factor.

Figure 2A:
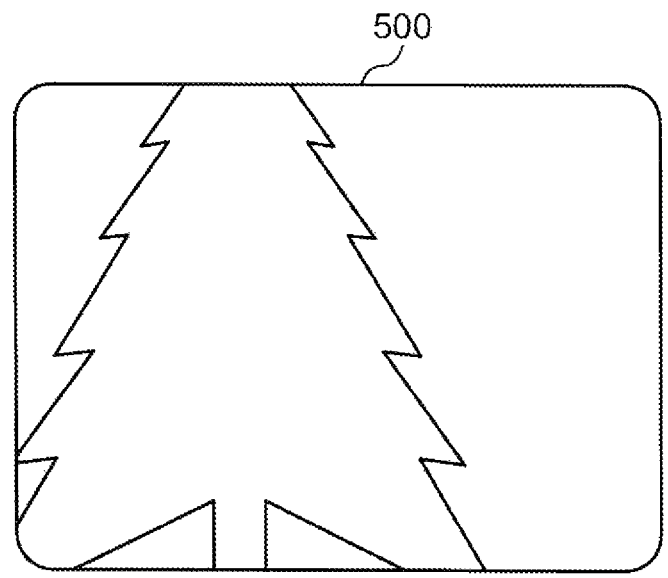
FIG. 2A is a view of a screen of a display section displaying the live view display of an image and shows a state in which an enlarged image is displayed over the whole display screen.
Figure 2B:
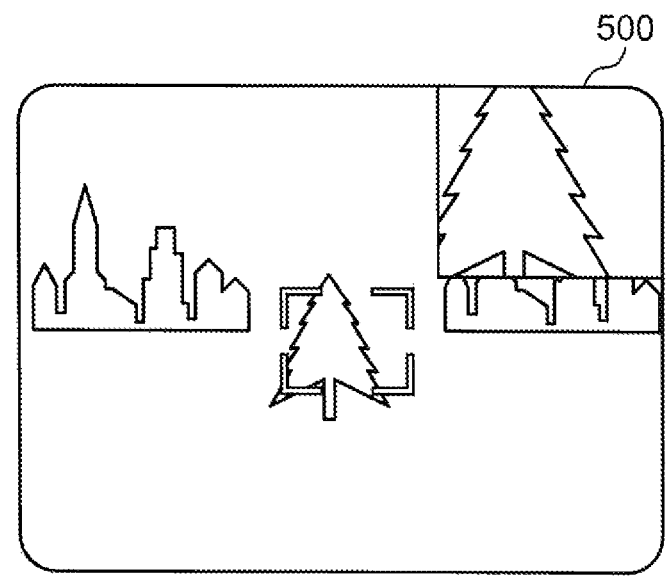
FIG. 2B is a view of a screen of a display section displaying the live view display of an image and displays an enlarged image only in a part of the display screen.

To put it concretely, when a user perform the switching to the manually focusing mode with the switching switch of the operating section 60 and depresses the display button in the manually focusing mode, the CPU 11 performs the trimming and enlargement processing of the images sequentially imaged by the imaging section 20 as the objects of live view displays (that is, the images imaged by the imaging section 20 according to the optical zoom magnification set by the operating section 60), and thereby performs the control of displaying the parts of the images on the display section 80 as focus adjusting confirmation screens 500 while further enlarging the parts by the predetermined enlargement factor (the enlargement factor set beforehand as an initial value or the enlargement factor to be changed at the time of the execution of the enlargement factor adjustment program, described below). As shown in FIG. 2A, one of the focus adjusting confirmation screens 500 may be configured to perform a display over the whole of the display screen of the display section 80, or as shown in FIG. 2B, the focus adjusting confirmation screen 500 may be configured to perform the display only in a part of the display screen of the display section 80 in which an ordinary live view display is performed (that is the live view display to which the aforesaid enlargement processing and the like are not performed) here. Furthermore, it is needless to say that the imaging apparatus 1 may be configured in such a way that the CPU 11 performs the control of a display by switching a pattern in which the focus adjusting confirmation screen 500 is displayed over the whole display screen and a pattern in which the focus adjusting confirmation screen 500 is displayed only in a part of the display screen by the operation of the operating section 60 by a user.

The enlargement factor adjustment program is a program for enabling the CPU 11 to execute the function of changing the enlargement factor at the time of displaying a part of an image by enlarging the part at the time of the execution of the enlargement display control program on the basis of the shake quantity and the optical zoom magnification when the part of the image is displayed on the display section 80 by being enlarged.

To put it concretely, when a part of an image is displayed by being enlarged as a focus adjusting confirmation screen by the execution of the enlargement display control program, the CPU 11 executes the enlargement factor adjustment program to input a shake quantity (camera shake quantity) of the imaging apparatus 1 from the shake quantity detecting section 50, and obtains an optical zoom magnification on the basis of a drive control signal output to the lens driving section 42. That is, the CPU 11 obtains the camera shake quantity and the optical zoom magnification as parameters when a part of an image is displayed on the display section 80 by being enlarged and a user performs a focus adjustment in the manually focusing mode. Then, the CPU 11 reads out an evaluation value table shown in FIG. 3 from the memory section 12 and extracts an evaluation value corresponding to the obtained parameters (shake quantity and optical zoom magnification). Then, the CPU 11 determines a target enlargement factor (the target value of the enlargement factor after a change when the enlargement factor is changed) according to the extracted evaluation value.

In the state in which a part of the image displayed on the display section 80 is enlarged, here, the larger the values of the shake quantity and the optical zoom magnification are, the more the subject in the display screen easily performs a large position change and is easily missed. Then, in the state in which the optical zoom magnification is large, the focus adjustment of a user becomes difficult in the manually focusing mode. Consequently, the CPU 11 determines the target enlargement factor in such a way that the larger the evaluation value corresponding to the integrated value of an optical zoom magnification and a shake quantity in the evaluation value table is, the smaller the value of the target enlargement factor is.

Furthermore, the CPU 11 calculates the time-based variation quantity of the enlargement factor by dividing the difference quantity between the set enlargement factor and the target enlargement factor by the total sum of the time necessary for changing the enlargement factor in order that the enlargement factor (set enlargement factor) at the time of displaying a part of an image by enlarging it at the time of the execution of the enlargement display control program may gradually approach the determined target enlargement factor. Then, the CPU 11 performs the processing of changing the enlargement factor over time on the basis of the calculated time-based variation quantity.

In addition, although the integrated values of the optical zoom magnifications and the shake quantities are made as evaluation values in the evaluation value table in FIG. 3, it is needless to say that, for example, the target enlargement factors themselves may be described as the evaluation values.

(Enlargement Factor Adjusting Processing)

Next, the enlargement factor adjusting processing by the imaging apparatus 1 according to the present embodiment will be described with reference to the flow chart shown in FIG. 4.

First, when the power source is turned on by a user with the operating section 60 and the imaging apparatus 1 is switched to the imaging mode, the CPU 11 sets the set enlargement factor to the initial value determined beforehand (Step S101).

Next, the CPU 11 judges whether the user has operated the operating section 60 (switching switch) to switch the focusing mode to the manually focusing mode or not (whether the manually focusing mode is kept or not) (Step S102).

Then, if the CPU 11 judges that the focusing mode is not switched to the manually focusing mode at Step S102 (Step S102: No), the CPU 11 presumes that the focusing mode is switched to the automatic focusing mode and executes the automatic focusing processing (Step S103), and the CPU 11 advances the processing to that at Step S114. In addition, in the automatic focusing processing, the CPU 11 performs an ordinary live view display for displaying the whole of an image according to an optical zoom magnification on the display screen of the display section 80 without performing any focus confirming enlargement display unlike the execution processing of the enlargement display control program by the CPU 11 in the manually focusing mode, which will be described below. Then, in a live view display in the automatic focusing processing, an automatic focusing (AF) frame showing the subject region of an object of the focus adjustment in automatic focusing is displayed in place of performing the focus confirming enlargement display.

On the other hand, if the CPU 11 judges that the focusing mode is switched to the manually focusing mode at Step S102 (Step S102: Yes), the CPU 11 images a subject with the imaging section 20 to generate an image (Step S104).

Next, the CPU 11 judges whether the user operates the operating section 60 (display button) to select the display of a focus adjusting confirmation screen or not (Step S105).

Then, if the CPU 11 judges that the display of the focus adjusting confirmation screen is not selected at Step S105 (Step S105: No), the CPU 11 makes the display section 80 display the whole image (that is, the image itself that has not been subjected to enlargement processing) generated at Step S104 (Step S106), and advances the processing to that at Step S114 (the processing of an ordinary live view display is performed).

On the other hand, if the CPU 11 judges that the display of the focus adjusting confirmation screen has been selected (Step S105: Yes), the CPU 11 executes the enlargement display control program to display a part of the image generated at Step S104 by enlarging by the set enlargement factor (Step S107). Then, the user sights the image enlarged at Step S107 on the display section 80 and performs the operation of the operating section 60 (adjustment button) for a focus adjustment and the operation of the operating section 60 (setting button) for changing the optical zoom magnification as the occasion demands.

Next, the CPU 11 executes the enlargement factor adjustment program to obtain the shake quantity of the imaging apparatus 1 and the optical zoom magnification (Step S108). Then, the CPU 11 extracts the evaluation value corresponding to the parameters (shake quantity and optical zoom magnification) obtained at Step S108 from the evaluation value table of the memory section 12 to determine the target enlargement factor (Step S109). The CPU 11 judges whether the set enlargement factor and the target enlargement factor determined at Step S109 are the same or not here (Step S110), and if the CPU 11 judges that the both are the same (Step S110: Yes), then the CPU 11 does not change the enlargement factor but advances the processing to that at Step S114.

On the other hand, if the CPU 11 judges that the both are not the same at Step S110 (Step S110: No), the CPU 11 calculates the time-based variation quantity (the variation quantity per unit time) of the enlargement factor from the difference quantity between the set enlargement factor and the target enlargement factor (Step S111).

Next, the CPU 11 performs the time-based variation (changes a predetermined quantity every unit time) of the set enlargement factor toward the target enlargement factor on the basis of the time-based variation quantity calculated at Step S111 (Step S112). Then, the CPU 11 judges whether the set enlargement factor has reached the target enlargement factor or not on the basis of whether time has reached a predetermined time from the starting point of time of the processing at Step S112 or not on the basis of a signal pertaining to the time, which signal is output from the timer section 70 (Step S113). If the CPU 11 judges that the set enlargement factor has not reached the target enlargement factor (Step S113: No), the CPU 11 repeats the processing on and after Step S112.

On the other hand, if the CPU 11 judges that the set enlargement factor has reached the target enlargement factor at Step S113 (Step S113: Yes), the CPU 11 performs the other pieces of processing, such as focus adjusting processing/optical zoom magnification adjusting processing according to a focus adjusting operation/optical zoom magnification setting operation, respectively, by the user with the operating section 60, AE processing, judgment processing whether the shutter button is depressed in the operating section 60 or not, and image recording processing into the memory section 12, the storage section 90, and the like, when the shutter button is depressed (Step S114).

Then, the CPU 11 judges whether the imaging by the user has ended or not on the basis of whether the mode of the imaging apparatus 1 is switched to the reproducing mode by the user with the operating section 60 or not (Step S115). If the CPU 11 judges that the imaging does not end (Step S115: No), the CPU 11 repeats the processing on and after Step S102. On the other hand, if the CPU 11 judges that the imaging has ended at Step S115 (Step S115: Yes), the CPU 11 ends the present processing.

As described above, the imaging apparatus 1 of the present embodiment can obtain the following effects by the execution of the enlargement factor adjustment program by the CPU 11 and by the cooperative operations of the respective sections including the CPU 11.

The imaging apparatus 1 obtains the parameters when a part of an image is displayed on the display section 80 by being enlarged (when a user performs a focus adjustment or an adjustment of an optical zoom magnification in the manually focusing mode), and can change the enlargement factor at the time of displaying the part of the image by enlarging it at the time of the execution of the enlargement display control program on the basis of the obtained parameters. That is, the situation in which the enlargement factor at the time of displaying an image on the display section 80 is not suitable and a subject in the display screen performs a large position change to make a user's focus adjustment difficult can be prevented by configuring the imaging apparatus 1 to be able to change the enlargement factor as described above.

Consequently, it can be said that the imaging apparatus 1 can perform a focus adjustment by a manual operation on the basis of an image displayed by a live view display and the focus adjustment can easily be performed.

Furthermore, in the imaging apparatus 1, an optical zoom magnification can be set to an arbitrary magnification with the operating section 60, and the whole of an image generated by the imaging section 20 can be displayed on the display section 80 according to the optical zoom magnification set with the operating section 60. A part of the image generated by the imaging section 20 according to the set optical zoom magnification can be displayed on the display section 80 while further enlarging the part by a predetermined enlargement factor. That is, the imaging apparatus 1 is separately equipped with the enlargement display function of a part of an image through trimming and enlargement processing in addition to an optical zooming function using a zoom lens.

Furthermore, the imaging apparatus 1 changes a set enlargement factor in such a way that the larger the values of a shake quantity and an optical zoom magnification as parameters are, the smaller the value of a target enlargement factor is. That is, the larger the values of the shake quantity and the optical zoom magnification are, the larger the position change of a subject in a display screen is, and the more a focus adjustment becomes difficult. Consequently, a user's focus adjustment can be made easy by changing the target enlargement factor to be a smaller value.

Furthermore, the imaging apparatus 1 determines a target enlargement factor on the basis of obtained parameters, and calculates a time-based variation quantity of an enlargement factor in order that the set enlargement factor may gradually approach the target enlargement factor. The imaging apparatus 1 can thus change the set enlargement factor overtime on the basis of the calculated time-based variation quantity. That is, the enlargement factor is not instantaneously changed from a set enlargement factor to a target enlargement factor, but can gradually be changed. Consequently, no feeling of wrongness is given to a user sighting the display section 80.

Furthermore, the imaging apparatus 1 is configured to determine a target enlargement factor by the means of a shake quantity of the imaging apparatus 1 detected by the shake quantity detecting section 50 as a camera shake quantity together with an optical zoom magnification. That is, because the target enlargement factor is determined on the basis of both of the shake quantity and the optical zoom magnification, the set enlargement factor can be changed to a more appropriate enlargement factor.

Furthermore, the imaging apparatus 1 is configured to switch the focusing mode thereof between the manually focusing mode and the automatic focusing mode with the operating section 60, and performs the control of a display of a focus adjusting confirmation screen on the display section 80 in the case of the switching to the manually focusing mode.

That is, because the imaging apparatus 1 displays a focus adjusting confirmation screen only in the case of the switching to the manually focusing mode, it can be prevented to cause a user selecting the automatic focusing mode unnecessary confusion.

Furthermore, the imaging apparatus 1 is configured to allow a user to select whether to display the focus adjusting confirmation screen 500 or not in the case of the switching to the manually focusing mode with the operating section 60, and performs the control of displaying the focus adjusting confirmation screen 500 in the case of the selection of the display of the focus adjusting confirmation screen 500. That is, because the user can freely select whether to display the focus adjusting confirmation screen 500 or not in the state of the switching to the manually focusing mode, the convenience of the imaging apparatus 1 for the user is improved.

Furthermore, the imaging apparatus 1 can perform the control for displaying the focus adjusting confirmation screen 500 only in apart of the display screen of the display section 80. That is, because a user can perform a focus adjustment in the part of the display screen and can parallely perform the other operations such as the confirmation of a subject in the angle of view through the part of the display screen other than the aforesaid part for the focus adjustment, the convenience of the imaging apparatus 1 is improved.

Embodiment 2

Next, an imaging apparatus 1a according to an embodiment 2 will be described with reference to FIGS. 5-7.

Here, although the imaging apparatus 1 according to the embodiment 1 is configured to determine a target enlargement factor on the basis of a shake quantity and an optical zoom magnification by using the shake quantity of the imaging apparatus 1 detected by the shake quantity detecting section 50 as a camera shake quantity, the imaging apparatus 1a is different from the imaging apparatus 1 of the embodiment 1 in the point of determining whether to vary or keep a set enlargement factor on the basis of a deflection quantity without determining the target enlargement factor by using the deflection quantity of an image enlarged by a set enlargement factor as a camera shake quantity.

In addition, the configuration of the imaging apparatus la similar to that of the imaging apparatus 1 of the embodiment 1 will be denoted by the mark same as that of the imaging apparatus 1 in the following description, and the description of the similar configuration will be omitted.

Figure 5:
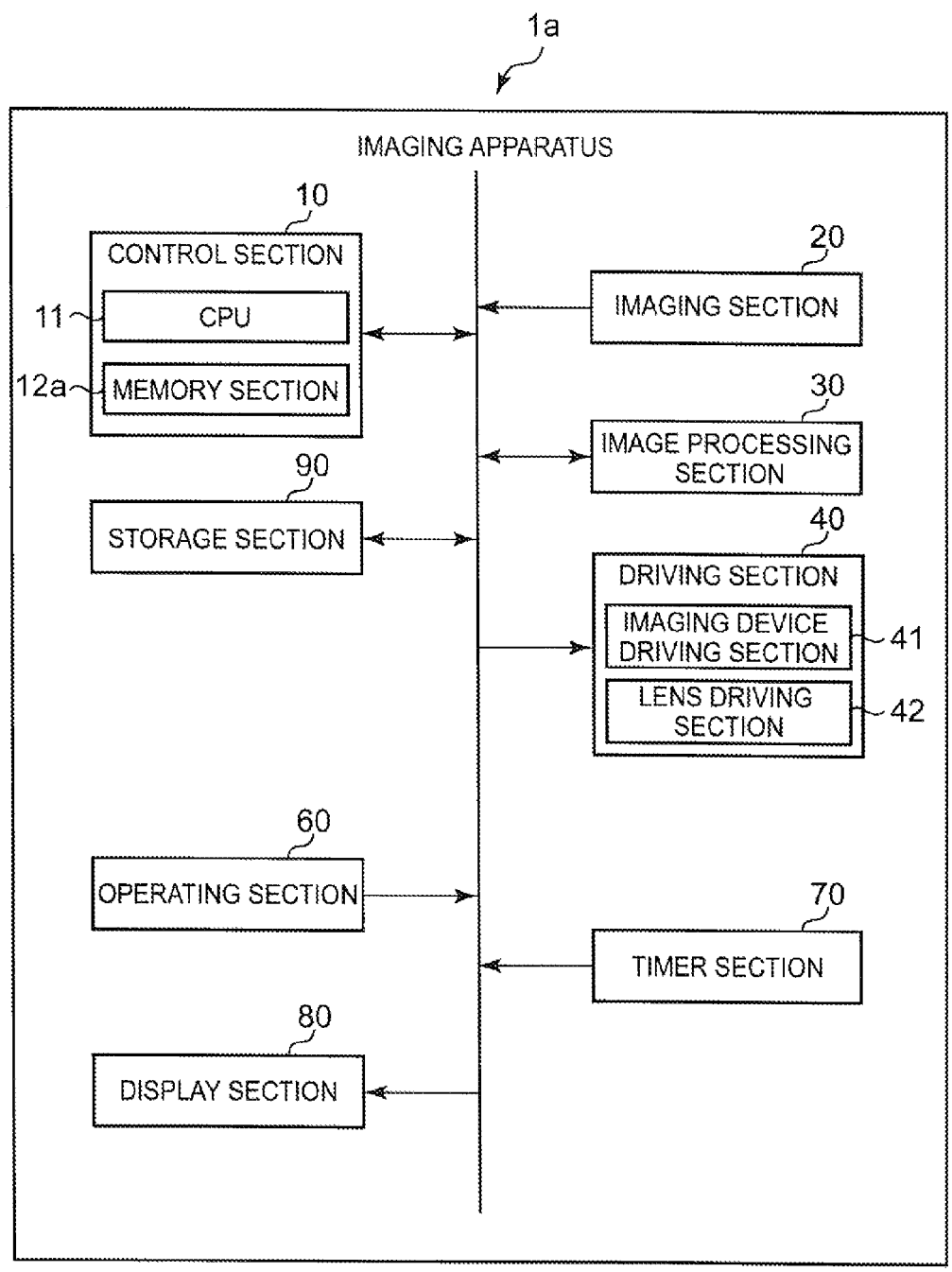
FIG. 5 is a block diagram showing the configuration of the principal part of an image apparatus according to an embodiment 2 of the present invention.

As shown in FIG. 5, the imaging apparatus 1a is composed of the control section 10, the imaging section 20, the image processing section 30, the driving section 40, the operating section 60, the timer section 70, the display section 80, and the storage section 90.

A memory section 12a of the control section 10 is composed of a buffer memory for temporarily storing the data to be processed by the CPU 11 and the like, and a program memory for storing the various programs and data pertaining to the execution of the CPU 11. Then, there are an enlargement display control program and an enlargement factor adjustment program as the programs stored in the memory section 12a, and there are an evaluation value table and an evaluation value correspondence table pertaining to the execution of an enlargement factor adjustment program, which will be described below, and the like, as the data stored in the memory region 12.

Next, the enlargement factor adjustment program stored in the memory section 12a will be described.

The enlargement factor adjustment program is a program for enabling the CPU 11 to execute the function of changing the enlargement factor at the time of displaying a part of an image by enlarging the part at the time of the execution of the enlargement display control program on the basis of the deflection quantity when the part of the image is displayed on the display section 80 by being enlarged.

To put it concretely, when a part of an image is displayed on the display section 80 by being enlarged as a focus adjusting confirmation screen by the execution of the enlargement display control program, the CPU 11 executes the enlargement factor adjustment program to compare the image displayed on the focus adjusting confirmation screen at the time of the execution of the enlargement display control program and an image based on the image frame preceding the aforesaid image by one. Then, the CPU 11 calculates the deflection quantity (moved quantity) of the enlarged image. The CPU 11 then reads out the evaluation value table shown in FIG. 6A from the memory section 12a and extracts an evaluation value corresponding to the obtained parameter (deflection quantity) from the evaluation table on the basis of the calculated deflection quantity. Next, the CPU 11 reads out the evaluation value correspondence table shown in FIG. 6B from the memory section 12a and determines whether to vary or keep the set enlargement factor to the enlargement factor set at that point of time according to the extracted evaluation value.

Furthermore, if the CPU 11 determines to vary the set enlargement factor (for example, the case where the evaluation value in the evaluation value correspondence table shown in FIG. 6B is within the range of 1-4 or the range of 16 or more), the CPU 11 performs the control of changing the enlargement factor over time in accordance with the time-based increase/decrease quantity of the enlargement factor until a previously determined set time or the like has elapsed. The time-based increase/decrease quantity of the enlargement factor indicates a previously determined increase quantity or a decrease quantity of the enlargement factor per unit time in order that the set enlargement factor may gradually increase or decrease over time, and the time-based increase/decrease quantity is a constant value independent of the evaluation value.

Here, the larger the value of the deflection quantity of an enlarged image in the state in which apart of the image is enlarged, the larger a position change of a subject in the display screen of the display section 80 is, and the more difficult the focus adjustment of a user in the manually focusing mode becomes. Accordingly, the CPU 11 sets the set time in such away that the larger the value of the deflection quantity (the evaluation value corresponding to the deflection quantity) of the enlarged image is, the smaller the value of the enlargement factor after the change is (that is, the CPU 11 sets the set time to be shorter in the case of increasing the set time and to be longer in the case of decreasing the set time).

(Enlargement Factor Adjusting Processing)

Next, the enlargement factor adjusting processing by the imaging apparatus 1a according to the present embodiment will be described with reference to the flow chart shown in FIG. 7.

Because the processing at Steps S101-S107 and Steps S114-S115 are the processing similar to those of the enlargement factor adjusting processing of the embodiment 1 here, the descriptions of those Steps will be omitted.

The CPU 11 executes the enlargement factor adjustment program to obtain (calculate) the deflection quantity of the image enlarged at Step S107 (Step S108a). Then, the CPU 11 extracts the evaluation value corresponding to the parameter (deflection quantity) obtained at Step S108a from the evaluation value table of the memory section 12a (Step S109a). The CPU 11 judges whether the extracted evaluation value is within the keeping range (within the range of evaluation values of 5-15 shown in FIG. 6B) in the evaluation value correspondence table or not here (Step S110a), and if the CPU 11 judges that the evaluation value is within the keeping range (Step S110a: Yes), then the CPU 11 does not change the enlargement factor but advances the processing to that at Step S114.

On the other hand, if the CPU 11 judges that the extracted evaluation value is not within the keeping range at Step S110a (Step S110a: No), the CPU 11 sets a set time and performs the time-based variation of the set enlargement factor according to the time-based increase/decrease quantity (Step S111a). Then, the CPU 11 judges whether the set time has elapsed or not on the basis of a signal pertaining to the time, which signal is output from the timer section 70 (Step S112a). If the CPU 11 judges that the set time has not elapsed (Step S112a: No), the CPU 11 repeats the processing on and after Step S111a. On the other hand, if the CPU 11 judges that the set time has elapsed (Step S112a: Yes), the CPU 11 advances the processing to that at Step S114.

As described above, according to the imaging apparatus 1a of the present embodiment, it is needless to say that the effects similar to those of the imaging apparatus 1 of the embodiment 1 can be obtained. Furthermore, when the CPU 11 executes the enlargement factor adjustment program, the CPU 11 determines whether to vary or keep the set enlargement factor to the enlargement factor set at that point of time on the basis of the obtained parameter, and varies the set enlargement factor over time on the basis of the time-based increase/decrease quantity of the enlargement factor. Consequently, it is needless to calculate any target enlargement factors, and the reduction of the processing load of the control section 10 can be expected in comparison with the imaging apparatus 1.

Furthermore, because the imaging apparatus 1a determines whether to vary or keep the set enlargement factor by using the deflection quantity of an image calculated at the time of the execution of the enlargement factor adjustment program by the CPU 11 as a camera shake quantity, the configuration for detecting a shake quantity of the imaging apparatus 1a with a sensor or the like for shake quantity detection is not needed. Consequently, the reduction of the manufacturing cost of the imaging apparatus 1a can be achieved.

Embodiment 3

Next, an imaging apparatus 1b according to an embodiment 3 will be described with reference to FIGS. 8-9.

Although the imaging apparatus 1a according to the embodiment 2 is configured to determine whether to vary or keep a set enlargement factor to the enlargement factor set at that point of time on the basis of a deflection quantity by using the deflection quantity of an enlarged image as a camera shake quantity without determining a target enlargement factor here, the imaging apparatus 1b according to the embodiment 3 obtains a sharpness on the basis of the imaging processing detecting the high-frequency components of an image generated by the imaging section 20. The imaging apparatus 1b is different from the imaging apparatus 1a in the point of being configured to determine whether to vary or keep a set enlargement factor on the basis of a sharpness by using the sharpness as a parameter similar to the aforesaid camera shake quantity without determining any target enlargement factors.

In addition, the configuration similar to those of the imaging apparatus 1 according to the embodiment 1 and the imaging apparatus 1a according to the embodiment 2 is denoted by the same mark as those of the imaging apparatus 1 and 1a, and the description thereof will be omitted in the following description of the imaging apparatus 1b.

Figure 8:
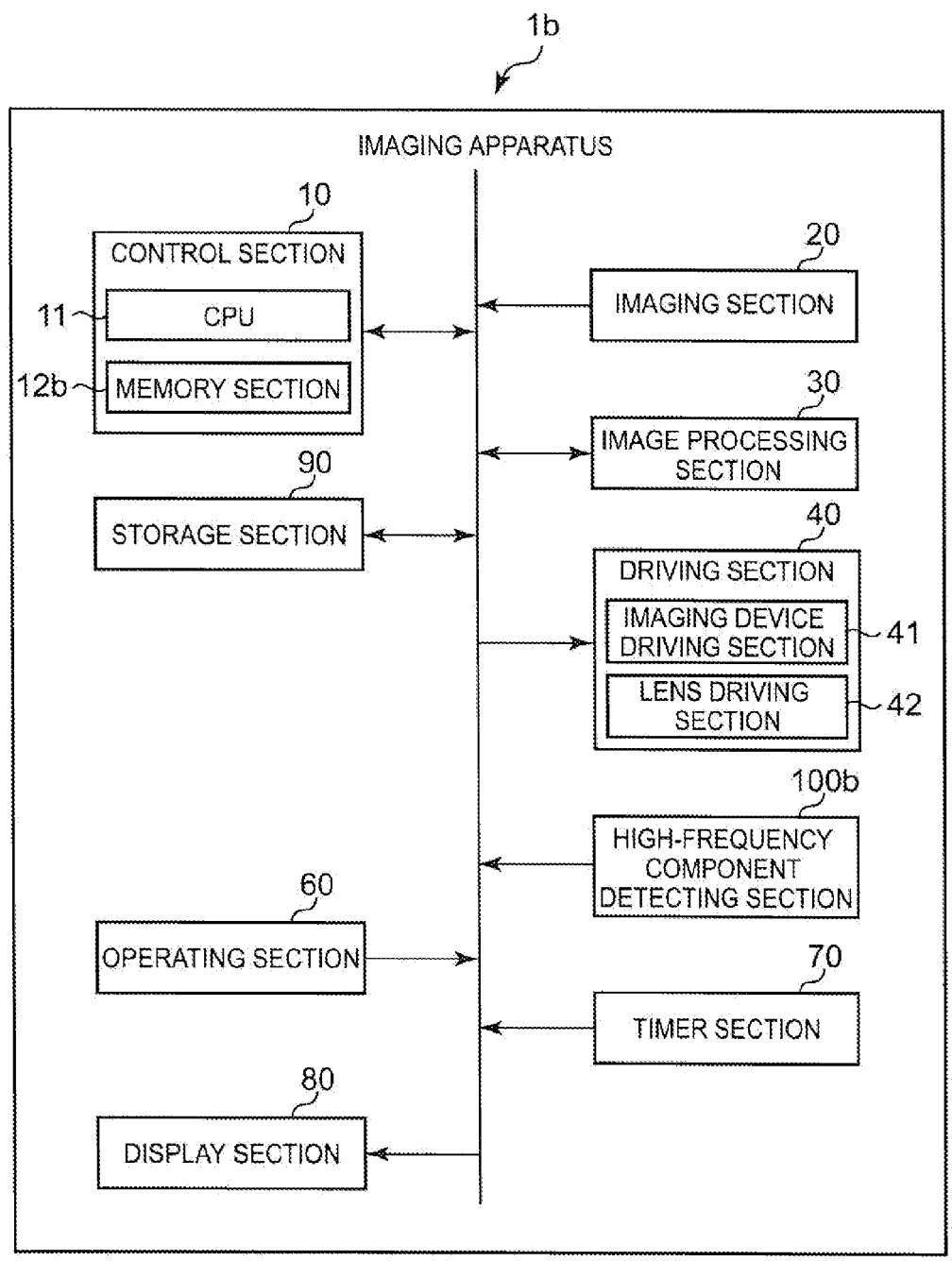
FIG. 8 is a block diagram showing the configuration of the principal part of an image apparatus according to an embodiment 3 of the present invention.

As shown in FIG. 8, the imaging apparatus 1b is composed of the control section 10, the imaging section 20, the image processing section 30, the driving section 40, the display section 80, the timer section 70, the operating section 60, the storage section 90, and a high-frequency component detecting section 100b.

The high-frequency component detecting section 100b obtains a sharpness on the basis of imaging processing for detecting high-frequency components of an image generated by the imaging section 20. To put it concretely, the high-frequency component detecting section 100b performs a two-dimensional Fourier transform to a generated image to convert the image into a function of a frequency region. Then, the high-frequency component detecting section 100b calculates the rate of the components of a predetermined frequency or more among all of the frequency components by, for example, performing the processing of calculating the product of the converted function and a filter function of a high-pass filter, and outputs the calculation result to the control section 10 as the sharpness.

A memory section 12b of the control section 10 is composed of a buffer memory for temporarily storing the data to be processed by the CPU 11, and the like, and a program memory for storing the various programs and data pertaining to the execution of the CPU 11. Then, there are an enlargement display control program and an enlargement factor adjustment program as the programs stored in the memory section 12b, and there are an evaluation value table and an evaluation value correspondence table pertaining to the execution of an enlargement factor adjustment program, which will be described below, and the like, as the data stored in the memory region 12b.

Next, the enlargement factor adjustment program stored in the memory section 12b will be described.

The enlargement factor adjustment program is a program for enabling the CPU 11 to execute the function of changing the enlargement factor at the time of displaying a part of an image by enlarging the part at the time of the execution of the enlargement display control program on the basis of a sharpness output from the high-frequency component detecting section 100b.

To put it concretely, when a part of an image is displayed by being enlarged as a focus adjusting confirmation screen by the execution of the enlargement display control program, the CPU 11 obtains a sharpness output from the high-frequency component detecting section 100b. Then, the CPU 11 reads out the evaluation value table from the memory section 12b and extracts an evaluation value corresponding to the obtained parameter (sharpness) from the evaluation table. Because the sharpness expresses the degree of a focus adjustment (the degree of a sharpness of an image grasped by the sense of sight of a user as a sharp image) of a subject, here, the smaller a value of the sharpness is, the larger an assigned evaluation value is, adversely to the evaluation table of the deflection quantities shown in FIG. 6A.

Next, the CPU 11 reads out the evaluation value correspondence table same as that of FIG. 6B from the memory section 12b, and determines whether to vary or keep the set enlargement factor according to the extracted evaluation value.

Furthermore, if the CPU 11 determines to vary the set enlargement factor (for example, the case where the evaluation value in the evaluation value correspondence table shown in FIG. 6B is within the range of 1-4 or the range of 16 or more), the CPU 11 performs the processing of changing the enlargement factor over time in accordance with the time-based increase/decrease quantity of the enlargement factor (an increase quantity or a decrease quantity of the enlargement factor per unit time determined in advance in order that the set enlargement factor may gradually increase or decrease over time) until a previously determined set time or the like has elapsed.

Here, the smaller the value of the sharpness of an enlarged image is in the state in which a part of the image is enlarged, the more an unfocused state of the subject in the display screen of the display section 80 is regarded by a user, and the larger the difficulty of the focus adjustment of the user in the manually focusing mode becomes.

Accordingly, the CPU 11 sets the set time in such a way that the smaller the value of the sharpness is, the smaller the value of the enlargement factor after a change is.

(Modification)

A display of enlarging a part of an image is performed in the aforesaid embodiments in order to improve the operability in the case where a user performs a focus adjustment by a manual operation at the time of manually focusing mode. That is, only in the case of judging that the user has changed the focusing mode to the manually focusing mode at Step S102, the processing from Step S104 to Step S113 is made to be performed.

A part of an image may, however, be displayed by being enlarged in order to improve the visibility when a user confirms the focus adjustment state in automatic focusing at the time of the automatic focusing mode not only at the time of the manually focusing mode.

In this case, a part of the aforesaid embodiment is modified as follows.

That is, if the CPU 11 judges that the focusing mode is changed to the automatic focusing mode at Step S102, the CPU 11 performs the processing similar to that from Step S104 to Step S113.

In the automatic focusing mode, however, the following processing pertaining to the automatic focusing is executed in the series of the pieces of the processing from Step S104 to Step S113.

After the execution of the processing at Step S104, the CPU 11 displays an AF frame showing a subject region, which is the object of the automatic focusing, and executes the automatic focusing processing by a contrast system by using a subject in this AF frame as the object.

Then, at the time of the enlargement display at Step S107, the CPU 11 enlarges the image in the AF frame to display the enlarged image.

By such processing, it becomes possible for a user to easily confirm the focus state of the subject portion, which is the object of the automatic focusing.

(Enlargement Factor Adjusting Processing)

Next, the enlargement factor adjusting processing by the imaging apparatus 1b according to the present embodiment will be described with reference to the flow chart shown in FIG. 9.

Because the processing other than that at Step S108b is the processing similar to those of the enlargement factor adjusting processing of the embodiment 2 here, the descriptions of those Steps will be omitted.

When a part of an image is enlarged to be displayed on the display section 80 after the execution of the processing until Step S107, the CPU 11 executes the enlargement factor adjustment program to obtain a sharpness when a user performs a focus adjustment by using the image from the high-frequency component detecting section 100b (Step S108b). Then, the CPU 11 performs the processing on and after Step S109a on the basis of the sharpness obtained at Step S108b.

As described above, according to the imaging apparatus 1b of the present embodiment, it is needless to say that the effects similar to those of the imaging apparatus 1a of the embodiment 2 can be obtained. Furthermore, when the CPU 11 executes the enlargement factor adjustment program and determines whether to vary or keep the set enlargement factor on the basis of the obtained parameter, it is necessary to calculate the deflection quantity of the image enlarged by the set enlargement factor as a parameter in the embodiment 2. However, it is only necessary to input a sharpness output from the high-frequency component detecting section 100b as a parameter in the imaging apparatus 1b, and consequently the reduction of the processing load of the control section 10 can be achieved.

In addition, the embodiments described above are only examples of the suitable image forming apparatus according to the present invention, and the scope of the present invention is not limited to those embodiments.

Furthermore, the minute configuration and the minute operation of each section of the image forming apparatus of the embodiments described above can suitably be changed without departing from the subject matter of the present invention.

For example, it is needless to say that the high-frequency component detecting section 100b of the embodiment 3 is provided to the imaging apparatus 1 according to the embodiment 1 and the imaging apparatus 1a of the embodiment 2, and that, when the CPU 11 executes the enlargement factor adjustment program, the CPU 11 may use a sharpness output from the high-frequency component detecting section 100b together with a camera shake quantity and an optical zoom magnification as the parameters for determining an evaluation value (in this case, the larger the value of the sharpness is, the smaller the evaluation value to be determined becomes). Thereby, because the CPU 11 results in determining the evaluation value compositively by means of a plurality of parameters, a more appropriate evaluation value can be determined.

Figure 4:
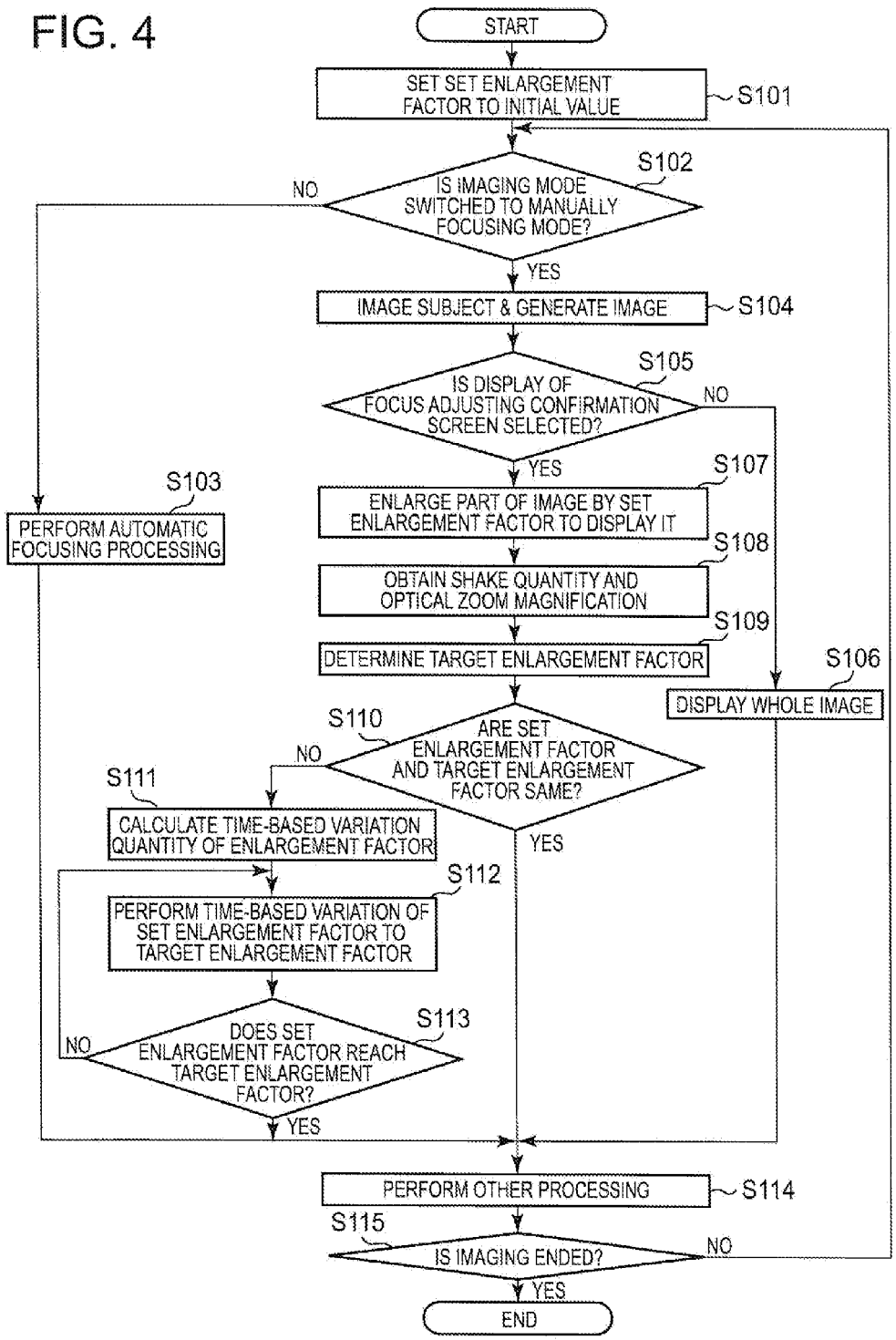
FIG. 4 is a flow chart for describing enlargement factor adjusting processing of the imaging apparatus of the embodiment 1 of the present invention.
Figure 7:
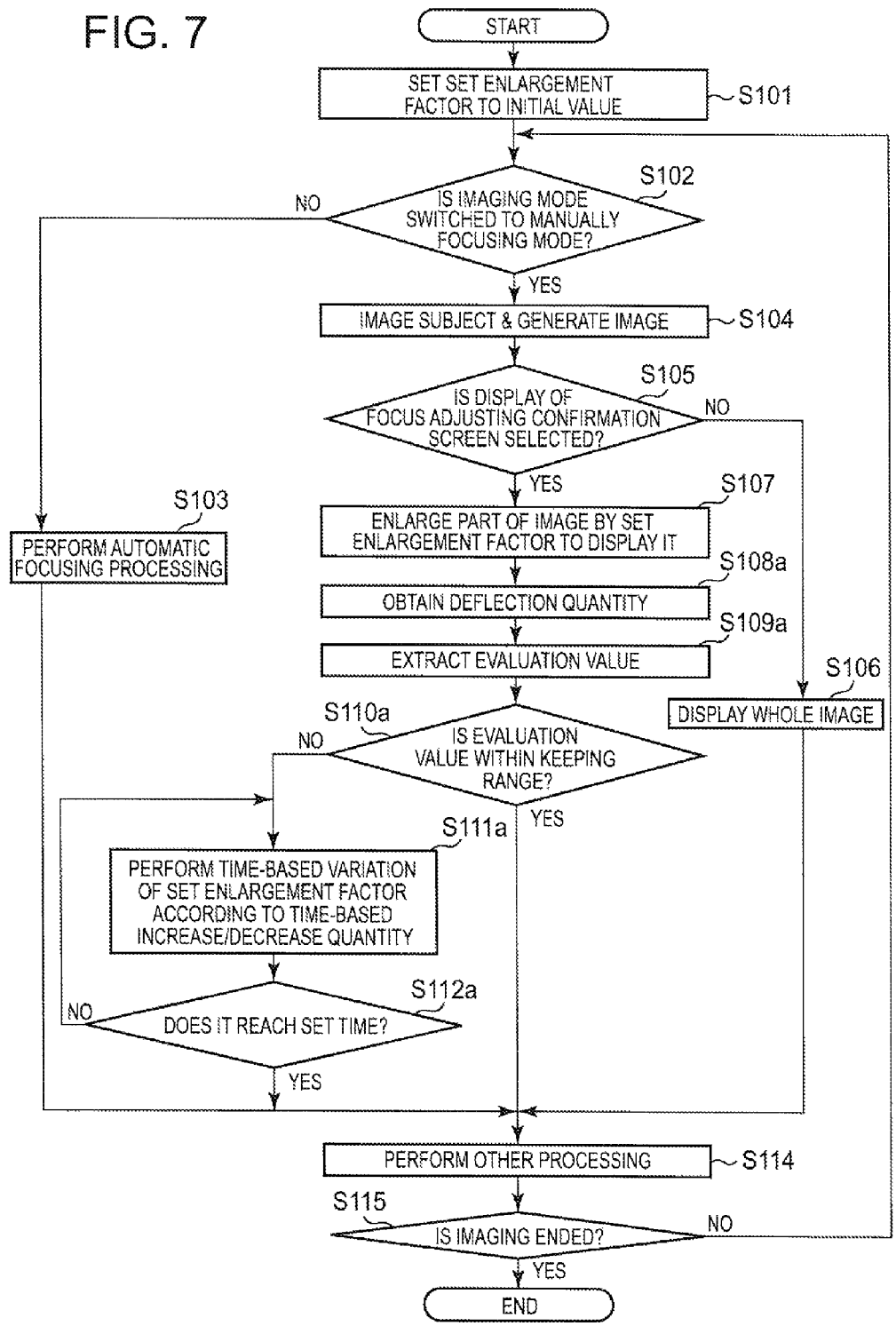
FIG. 7 is a flow chart for describing enlargement factor adjusting processing of the imaging apparatus of the embodiment 2 of the present invention.

Furthermore, although the embodiments 1-3 are configured to repeat the enlargement factor adjusting processing by the imaging apparatus 1-1b at the timing of the imaging of a subject by the imaging section 20 to adjust an enlargement factor as shown at Steps S104-S115 of FIGS. 4, 7, and 9, it is needless to say that the embodiments 1-3 may be configured to repeat the enlargement factor adjusting processing at the timing when the time timed by the timer section 70 reaches a predetermined time to perform the adjustment.

According to a fist aspect of the present invention, an imaging apparatus equipped with an imaging section to generate images by imaging a subject, comprises:

a display section to sequentially display each of the images generated by the imaging section;

an enlargement display control section to sequentially display parts of the images generated by the imaging section on the display section while enlarging the parts by a predetermined enlargement factor;

a detecting section to detect a shake quantity of the imaging apparatus; and an enlargement factor control section to change the enlargement factor at a time of enlargement by the enlargement display control section according to the shake quantity detected by the detecting section.

Preferably, the enlargement factor control section changes the enlargement factor at the time of the enlargement by the enlargement display control section according to the shake quantity detected by the detecting section in such a way that the enlargement factor becomes smaller as the shake quantity becomes larger.

Preferably, the imaging apparatus further comprises an optical zoom section to set an optical zoom magnification to an arbitrary magnification, wherein the display section displays each of the images generated by the imaging section according to the optical zoom magnification set by the optical zoom section; and the enlargement display control section displays the parts of the images generated by the imaging section according to the optical zoom magnification set by the optical zoom section on the display section while further enlarging the parts by the predetermined enlargement factor.

Preferably, the enlargement display control section starts enlargement displays in conformity with an instruction operation by a user while each of the images generated by the imaging section are being displayed on the display section.

Preferably, the enlargement display control section switches an image displayed on the display section from an image before enlargement to an image after the enlargement in conformity with an instruction operation by the user.

Preferably, the enlargement display control section displays an image after enlargement by synthesizing the image with a part of an image before the enlargement.

Preferably, the imaging apparatus further comprises:

a focus adjusting section to perform a focus adjustment by a manual operation; and a frame display controlling section to display a frame showing an object region of enlargement on the display section, wherein the enlargement display control section sequentially displays images in the frame displayed by the frame display controlling section on the display section while enlarging the images by the predetermined enlargement factor.

Preferably, the imaging apparatus further comprises a focus adjusting section to perform a focus adjustment automatically, wherein the enlargement display control section sequentially displays the images of a subject portion on the display section, the images being objects of the automatic focus adjustment by the focus adjusting section, while enlarging the images by the predetermined enlargement factor.

Preferably the imaging apparatus further comprises:

a frame display controlling section to display a frame showing a subject region of an object of the automatic focus adjustment by the focus adjusting section on the display section, wherein the enlargement display control section sequentially displays images in the frame displayed by the frame display controlling section on the display section while enlarging the images by the predetermined enlargement factor.

Preferably, the enlargement factor control section determines a target value of the enlargement factor after a change based on a shake quantity detected by the detecting section;

the enlargement display control section calculates a time-based variation quantity of the enlargement factor in order that the enlargement factor at the time of enlarging the parts of the images to display them may gradually approach the determined target value; and the enlargement factor control section changes the enlargement factor at the time of the enlargement by the enlargement display control section based on the calculated time-based variation quantity over time.

Preferably, the enlargement factor control section determines whether to vary or keep the enlargement factor when the enlargement display control section enlarges the parts of the images to display the enlarged images to an enlargement factor set at that point of time based on the shake quantity detected by the detecting section; and if the enlargement factor control section determines to vary the enlargement factor, the enlargement factor control section changes the enlargement factor at the time of the enlargement by the enlargement display control section based on a time-based increase/decrease quantity of the predetermined enlargement factor over time.

Preferably, the enlargement factor control section changes enlargement factor at the time of the enlargement by the enlargement display control section according to a combination of the shake quantity detected by the detecting section and an optical zoom magnification set by an optical zoom section.

That is, the imaging apparatus can perform a focus adjustment by a manual operation on the basis of an image subjected to a live view display, and can easily perform the focus adjustment.

Furthermore, according to a second aspect of the present invention, an imaging apparatus equipped with an imaging section to generate images by imaging a subject, comprises:

an optical zoom section to set an optical zoom magnification to an arbitrary magnification;

a display section to sequentially display each of the images generated by the imaging section according to the optical zoom magnification set by the optical zoom section;

an enlargement display control section to sequentially display parts of the images generated by the imaging section according to the optical zoom magnification set by the optical zoom section on the display section while further enlarging the parts by a predetermined enlargement factor; and an enlargement factor control section to change the enlargement factor at a time of enlargement by the enlargement display control section according to the optical zoom magnification set by the optical zoom section.

Preferably, the enlargement factor control section changes the enlargement factor of the enlargement display control section according to the optical zoom magnification set by the optical zoom section in such a way that the enlargement factor becomes smaller as the optical zoom magnification becomes larger.

That is, the imaging apparatus can perform a focus adjustment by a manual operation on the basis of an image subjected to a live view display, and can easily perform the focus adjustment.

Furthermore according to a third aspect of the present invention, a recording medium records a control program of an imaging apparatus including an imaging section to generate images by imaging a subject, a display section to sequentially display each of the images generated by the imaging section, and a detecting section to detect a shake quantity of the imaging apparatus, the recording medium recording a program enabling a computer of the imaging apparatus to function as an enlargement display control section to sequentially display parts of the images generated by the imaging section on the display section while enlarging the parts by a predetermined enlargement factor; and an enlargement factor control section to change the enlargement factor at a time of enlargement by the enlargement display control section according to the shake quantity detected by the detecting section.

That is, the recording medium records a control program of an imaging apparatus capable of performing a focus adjustment by a manual operation on the basis of an image subjected to a live view display, and of performing the focus adjustment easily.

Furthermore, according to a fourth aspect of the present invention, a recording medium records a control program of an imaging apparatus including an imaging section to generate images by imaging a subject, an optical zoom section to set an optical zoom magnification to an arbitrary magnification, and a display section to sequentially display each of the images generated by the imaging section according to the optical zoom magnification set by the optical zoom section, the recording medium recording a program enabling a computer of the imaging apparatus to function as an enlargement display control section to sequentially display parts of the images generated by the imaging section on the display section according to the optical zoom magnification set by the optical zoom section while further enlarging the parts by a predetermined enlargement factor; and an enlargement factor control section to change the enlargement factor at a time of enlargement by the enlargement display control section according to the optical zoom magnification set by the optical zoom section.

That is, the recording medium records a control program of an imaging apparatus capable of performing a focus adjustment by a manual operation on the basis of an image subjected to a live view display, and of performing the focus adjustment easily.

Furthermore, according to a fifth aspect of the present invention, a control method of an imaging apparatus including an imaging section to generate images by imaging a subject, a display section to sequentially display each of the images generated by the imaging section, and a detecting section to detect a shake quantity of the imaging apparatus comprises the steps of:

sequentially displaying parts of the images generated by the imaging section on the display section while enlarging the parts by a predetermined enlargement factor; and changing the enlargement factor at a time of enlargement at the step of sequentially displaying the parts according to the shake quantity detected by the detecting section.

That is, the control method of an imaging apparatus can perform a focus adjustment by a manual operation on the basis of an image subjected by live view display, and the control method makes the focus adjustment easy.

Furthermore, according to a sixth aspect of the present invention, a control method of an imaging apparatus including an imaging section to generate images by imaging a subject, an optical zoom section to set an optical zoom magnification to an arbitrary magnification, and a display section to sequentially display each of the images generated by the imaging section according to the optical zoom magnification set by the optical zoom section comprises the steps of:

sequentially displaying parts of the images generated by the imaging section on the display section according to the optical zoom magnification set by the optical zoom section while further enlarging the parts by a predetermined enlargement factor; and changing the enlargement factor at a time of enlargement at the step of sequentially displaying the parts according to the optical zoom magnification set by the optical zoom section.

That is, the control method of an imaging apparatus can perform a focus adjustment by a manual operation on the basis of an image subjected by live view display, and the control method can make the focus adjustment easy.

All of the disclosures including the description, the claims, the drawings, and the abstract of Japanese Patent Application No. 2009-293577, filed on Dec. 25, 2009, are incorporated herein by reference.

Although various typical embodiments have been exemplified and described, the scope of the present invention is not limited to the matters of the embodiments described above. Consequently, the scope of the present invention is limited only by the following claims.

The invention claimed is:

1. An imaging apparatus including an imaging section to sequentially generate images by imaging a subject, the imaging apparatus comprising:
a display section to display the images sequentially generated by the imaging section;
an enlargement display control section to sequentially display parts of the images sequentially generated by the imaging section on the display section while enlarging the parts of the images sequentially generated by the imaging section by an enlargement factor, such that the enlarged parts are overlaid on a region of the images displayed on the display section;
a detecting section to detect a shake quantity of the imaging apparatus; and
an enlargement factor control section to change the enlargement factor at a time of enlargement of the parts of the images sequentially generated by the imaging section by the enlargement display control section to one of a plurality of different enlargement factors, based on a level of the shake quantity detected by the detecting section among a plurality of levels of shake quantity, while an enlargement factor of the images displayed on the display section is maintained.

2. The imaging apparatus according to claim 1, wherein the enlargement factor control section changes the enlargement factor at the time of the enlargement of the parts of the images sequentially generated by the imaging section by the enlargement display control section based on the level of the shake quantity detected by the detecting section such that the enlargement factor is smaller as the level of the shake quantity is larger.

3. The imaging apparatus according to claim 2, further comprising an optical zoom section to set an optical zoom magnification to an arbitrary magnification,
wherein the display section displays the images sequentially generated by the imaging section according to the optical zoom magnification set by the optical zoom section; and
wherein the enlargement display control section displays the parts of the images sequentially generated by the imaging section on the display section while enlarging the parts of the images sequentially generated by the imaging section by the enlargement factor determined by the enlargement factor control section, while the optical zoom magnification set by the optical zoom section is maintained.

4. The imaging apparatus according to claim 2, wherein the enlargement display control section starts enlargement display in accordance with an instruction operation by a user while the images sequentially generated by the imaging section are being displayed on the display section.

5. The imaging apparatus according to claim 4, wherein the enlargement display control section switches an image displayed on the display section from an image before enlargement to an image after the enlargement in accordance with the instruction operation by the user.

6. The imaging apparatus according to claim 2, wherein the enlargement display control section displays an image after enlargement by synthesizing a part of the image after enlargement with a part of the image before the enlargement.

7. The imaging apparatus according to claim 2, further comprising:
- a focus adjusting section to perform a focus adjustment by a manual operation; and
- a frame display controlling section to display a frame showing an object region of enlargement on the display section,
- wherein the enlargement display control section sequentially displays the parts of the images sequentially generated by the imaging section in the frame displayed by the frame display controlling section on the display section while enlarging the parts of the images sequentially generated by the imaging section by the enlargement factor.

8. The imaging apparatus according to claim 2, further comprising a focus adjusting section to perform a focus adjustment automatically, wherein the enlargement display control section sequentially displays images of a subject portion on the display section, the images of the subject portion being objects of automatic focus adjustment by the focus adjusting section, while enlarging the images of the subject portion by the enlargement factor.

9. The imaging apparatus according to claim 8, further comprising:
- a frame display controlling section to display a frame showing a subject region of an object of the automatic focus adjustment by the focus adjusting section on the display section,
- wherein the enlargement display control section sequentially displays images in the frame displayed by the frame display controlling section on the display section while enlarging the images of the subject portion by the enlargement factor.

10. The imaging apparatus according to claim 2, wherein the enlargement factor control section determines a target value of the enlargement factor from among the plurality of different enlargement factors based on the level of shake quantity detected by the detecting section among the plurality of levels of shake quantity;
- wherein the enlargement display control section calculates a time-based variation quantity of the enlargement factor such that the enlargement factor at the time of the enlargement of the parts of the images sequentially generated by the imaging section gradually approaches the determined target value; and
- wherein the enlargement factor control section changes the enlargement factor at the time of the enlargement by the enlargement display control section based on the calculated time-based variation quantity over time.

11. The imaging apparatus according to claim 2, wherein the enlargement factor control section determines whether to vary or maintain the enlargement factor when the enlargement display control section enlarges the parts of the images sequentially generated by the imaging section to an enlargement factor set at that point in time based on the shake quantity detected by the detecting section; and
- wherein if the enlargement factor control section determines to vary the enlargement factor, the enlargement factor control section changes the enlargement factor at the time of the enlargement by the enlargement display control section based on a time-based increase or decrease quantity of the enlargement factor over time.

12. The imaging apparatus according to claim 3, wherein the enlargement factor control section changes the enlargement factor at the time of the enlargement by the enlargement display control section based on a combination of the level of the shake quantity detected by the detecting section and an optical zoom magnification set by the optical zoom section.

13. A non-transitory computer-readable recording medium recording a control program of an imaging apparatus including an imaging section to sequentially generate images by imaging a subject, a display section to display the images sequentially generated by the imaging section, and a detecting section to detect a shake quantity of the imaging apparatus, the program enabling a computer of the imaging apparatus to function as elements comprising:
- an enlargement display control section to sequentially display parts of the images sequentially generated by the imaging section on the display section while enlarging the parts of the images sequentially generated by the imaging section by an enlargement factor, such that the enlarged parts are overlaid on a region of the images displayed on the display section; and
- an enlargement factor control section to change the enlargement factor at a time of enlargement of the parts of the images sequentially generated by the imaging section by the enlargement display control section to one of a plurality of different enlargement factors, based on a level of the shake quantity detected by the detecting section among a plurality of levels of shake quantity, while an enlargement factor of the images displayed on the display section is maintained.

14. A control method of an imaging apparatus including an imaging section to sequentially generate images by imaging a subject, a display section to display the images sequentially generated by the imaging section, and a detecting section to detect a shake quantity of the imaging apparatus, the control method comprising:
- sequentially displaying parts of the images sequentially generated by the imaging section on the display section while enlarging the parts of the images sequentially generated by the imaging section by an enlargement factor, such that the enlarged parts are overlaid on a region of the images displayed on the display section; and
- changing the enlargement factor at a time of enlargement of the parts of the images sequentially generated by the imaging section to one of a plurality of different enlargement factors, based on a level of the shake quantity detected by the detecting section among a plurality of levels of shake quantity, while an enlargement factor of the images displayed on the display section is maintained.

15. The imaging apparatus according to claim 1, wherein the enlargement display control section sequentially displays the parts of the images sequentially generated by the imaging section on the display section while enlarging the parts of the images sequentially generated by the imaging section by a set enlargement factor which is set at that point of time;
- wherein the enlargement factor control section changes the set enlargement factor at the time of the enlargement of the parts of the images sequentially generated by the imaging section by the enlargement display control section based on the level of the shake quantity detected by the detecting section;

wherein the imaging apparatus further comprises:
- a target enlargement factor determining section to determine a target enlargement factor based on the level of the shake quantity detected by the detecting section; and
- a calculating section to calculate a time-based variation quantity of the enlargement factor based on a difference between the set enlargement factor and the target enlargement factor; and wherein the enlargement factor control section performs time-based variation of the set enlargement factor toward the target enlargement factor based on the time-based variation quantity calculated by the calculating section.

* * * * *